United States Patent [19]

McKiernan

[11] Patent Number: 4,604,155
[45] Date of Patent: Aug. 5, 1986

[54] METHOD OF MAKING A MULTI-LAYERED PRESSURE HOSE UTILIZING INTERNAL FLUID PRESSURE

[75] Inventor: Patrick N. McKiernan, Lurgan, Northern Ireland

[73] Assignee: The Goodyear Tire & Rubber Company, Akron, Ohio

[21] Appl. No.: 418,919

[22] Filed: Sep. 16, 1982

[51] Int. Cl.[4] ............................................. F16L 11/04
[52] U.S. Cl. .................................. 156/287; 156/149; 156/172; 156/307.7
[58] Field of Search ................... 156/149, 172, 244.12, 156/244.13, 287, 294, 307.7; 138/125, 126

[56] References Cited

U.S. PATENT DOCUMENTS

| 3,018,800 | 1/1962 | Hanssens | 156/294 |
| 3,756,890 | 9/1973 | Galloway et al. | 156/244.13 |
| 3,944,453 | 3/1976 | Chudgar et al. | 156/244.13 |
| 4,102,724 | 7/1978 | Taylor | 156/149 |
| 4,111,237 | 9/1978 | Mutzner et al. | 138/125 |
| 4,196,754 | 4/1980 | Payne | 138/129 |
| 4,302,266 | 11/1981 | Kutnyak | 156/244.13 |
| 4,341,578 | 7/1982 | Chermak et al. | 156/149 |
| 4,347,090 | 8/1982 | Anderson et al. | 156/149 |

Primary Examiner—Jerome Massie
Attorney, Agent, or Firm—R. D. Thompson

[57] ABSTRACT

A method of manufacture of pressure hose is described. An uncured tubular structure including one or more sub-units each having a radially inner tubular layer of uncured elastomer and an outer tubular layer of filamentary reinforcing elements is subjected to fluid pressure in its bore. The fluid pressure forces uncured elastomer material into the interstices of the filamentary layer of each sub-unit and consolidates the uncured structure. A cover layer of elastomer material is thereafter applied and the covered structure is cured into an integral hose.

12 Claims, 6 Drawing Figures

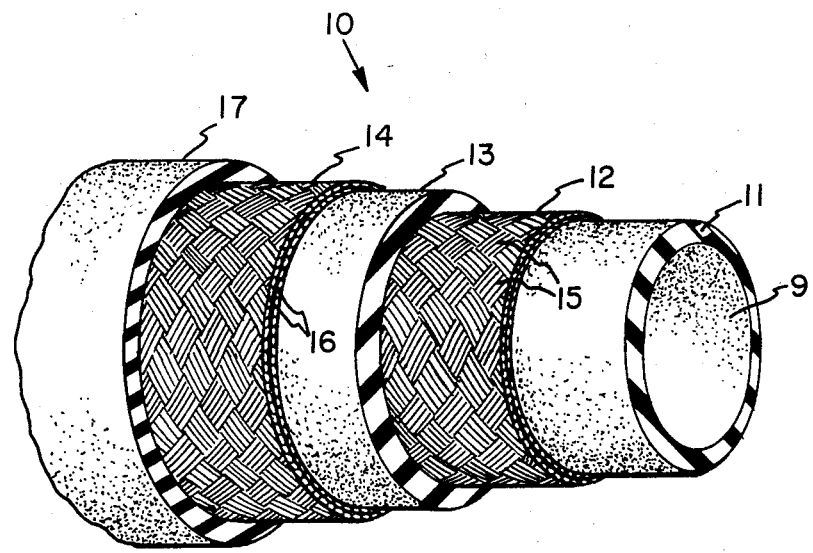
FIG. 1
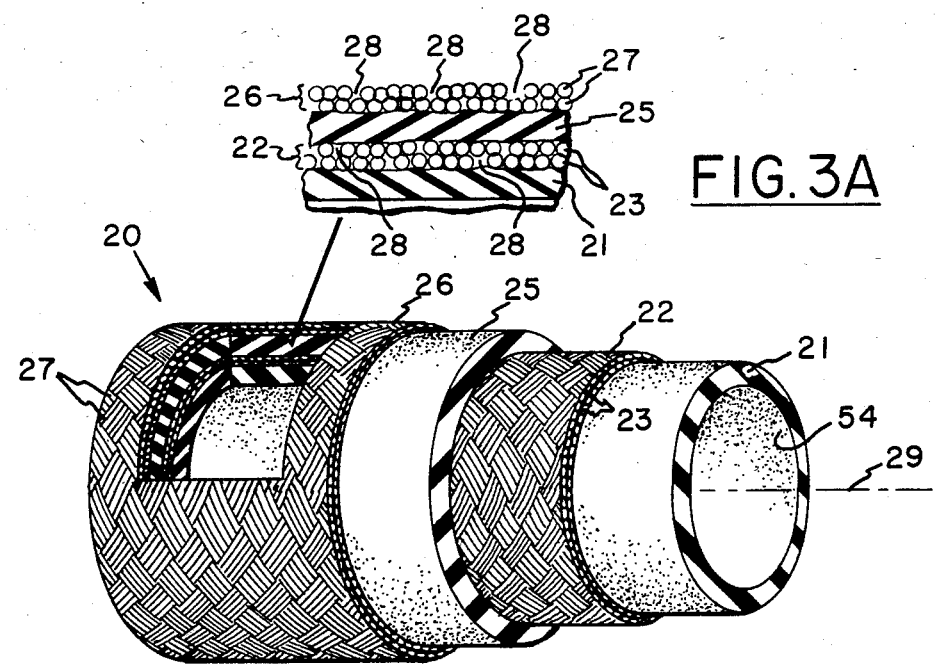
FIG. 3A
FIG. 3

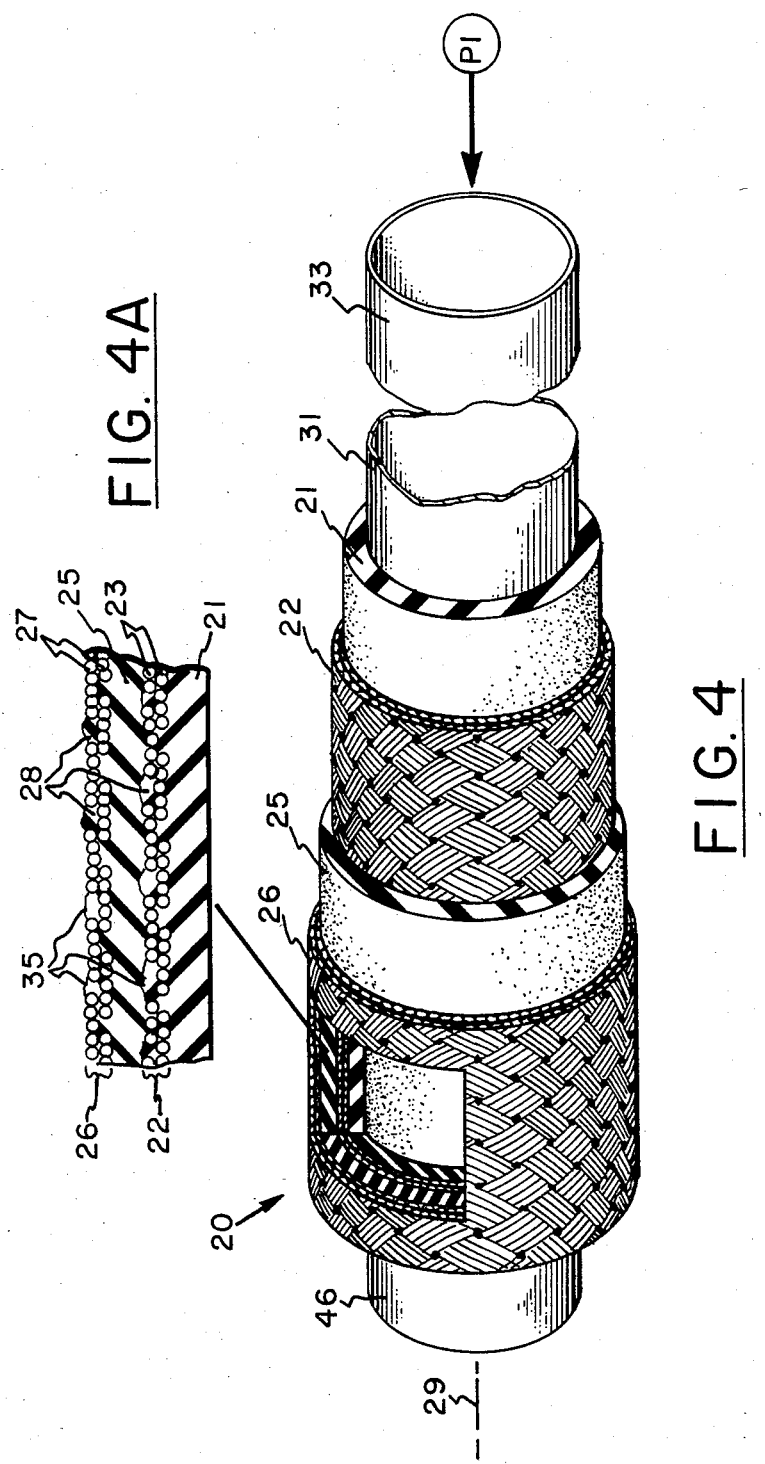

METHOD OF MAKING A MULTI-LAYERED PRESSURE HOSE UTILIZING INTERNAL FLUID PRESSURE

The foregoing abstract is not to be taken as limiting the invention of this application and in order to understand the full nature and extent of the technical disclosure of this application reference must be made to the accompanying drawings and the following detailed description.

The invention relates to pressure hose and more particularly to a method to be used in the manufacture of pressure hose. The invention is particularly useful in a method of making hydraulic hose in which a wire-reinforcing structure is incorporated.

Pressure hose has a body construction typically characterized by a plurality of tubular layers of elastomeric material and a layer of filamentary reinforcement material between each proximate pair of layers of elastomeric material. Many types of hydraulic hose incorporate one or two tubular wire braids and the usual tube and cover of elastomer material. Hydraulic hose is designed to conduct various types of gases and liquids at both high and low pressures. Such hose comprises a highly flexible tubular construction of selected rubber-like compounds based either on elastomers or polymers reinforced with wound or braided plies of wire and is fabricated by setting the polymers or vulcanizing the elastomers.

Such hydraulic hose may be subjected to relatively high pressures. By way of example only, a ¾ inch inside diameter SAE 100R2 hydraulic hose incorporates two tubular braided wire layers, a layer of elastomeric material immediately radially inwardly of each wire braid layer and an outer cover layer of vulcanized elastomeric material. This type of hose is required to burst at not less than 9000 psig. and must be capable of withstanding at least 200,000 pressure impulse cycles when tested according to Industrial Standard SAE J 517, June 1980.

Use of the methods described herein facilitates production of hydraulic hose having increased life as measured by the number of pressure impulse cycles the hose is able to withstand prior to failure.

The accompanying drawings illustrate the invention as applied to a typical two-wire braid hose and wherein:

FIG. 1 is a side elevation of a portion of a two-wire braid hydraulic hose with parts broken away and parts in cross-section illustrating a conventional hose construction;

FIG. 2 pictorially and schematically illustrates principal steps in the method of the invention;

FIG. 3 is a side elevation partly broken away and partly in section, of a portion of an uncured tubular structure including two layers of elastomer material and two wire braid layers;

FIG. 3A is an enlarged detail of the structure of FIG. 3;

FIG. 4 is a view similar to FIG. 1 showing the consolidation effect of the introduction of fluid pressure into the bore of the uncured tubular structure;

FIG. 4A is an enlarged detail of the structure of FIG. 4.

Figure 2:
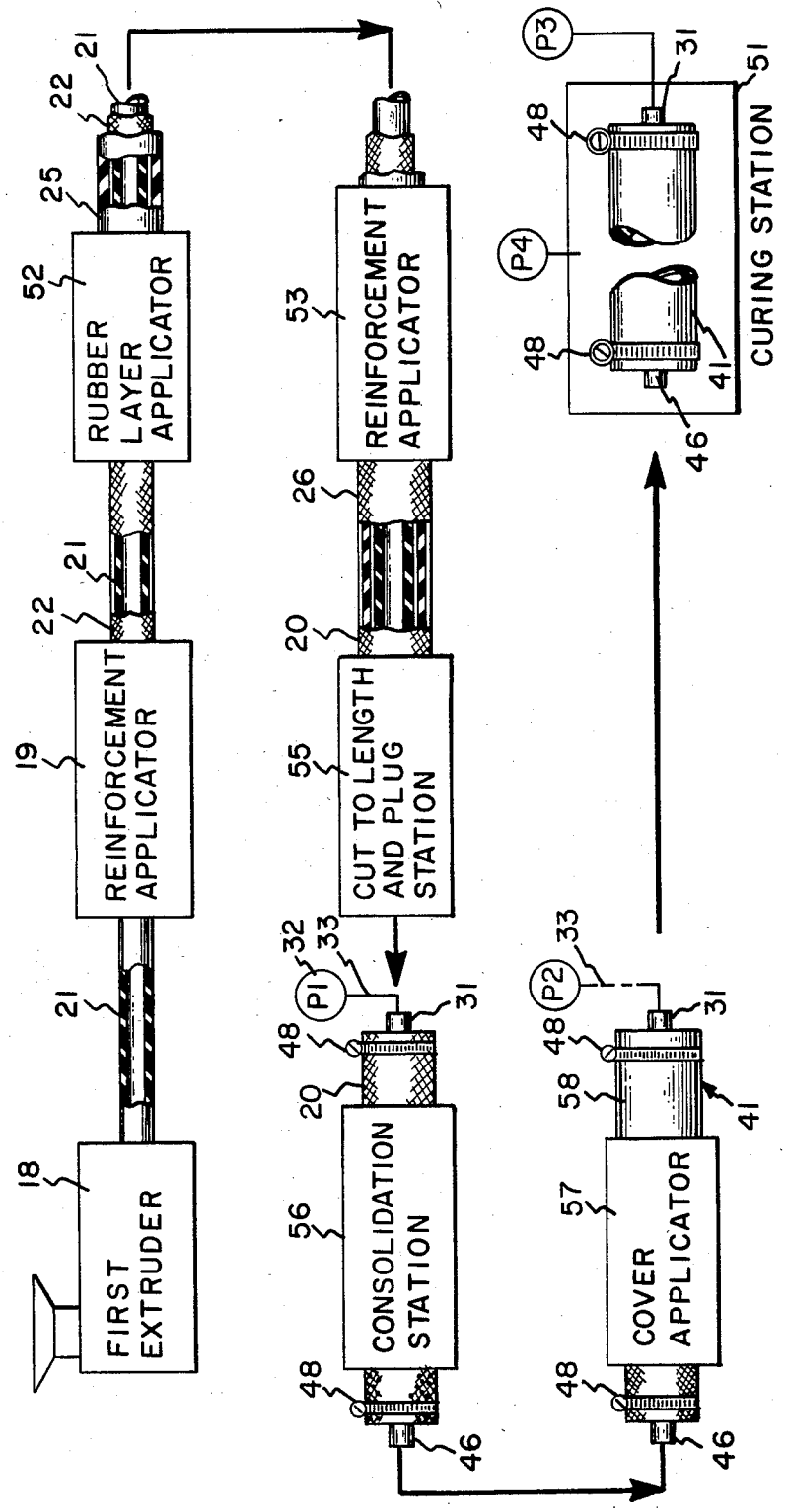

Referring to FIG. 1, it can be seen that a typical hydraulic hose 10 consists of a radially innermost tube 11 of elastomer material having a first tubular wire braid layer 12 formed thereover which in turn has a layer 13 of elastomer material formed thereover which in turn has a second tubular wire braid layer 14 formed thereover which in turn has a radially outermost cover 17 of elastomer material. The individual wires 15 of the first wire braid layer 12 and the individual wires 16 of the second braid layer 14 are of high tensile steel although other highly stress-resistant filamentary materials may be employed, for example, rayon, nylon, polyester terephthalate, aramid and fiberglass, polyvinyl alcohol and the like, depending on the service for which the hose is designed. The tube 10 is formed of elastomer material which is resistant to the fluid intended to be contained by the tube. The cover 17 is formed of elastomer material which is resistant to the environment in which the hose is to serve and is typically resistant to oil, abrasion, and weather.

Hose like that shown and described in FIG. 1 can be made as follows. Reference will be made to FIGS. 2–4A.

As will be understood by those skilled in the art, the uncured tubular structure 20 illustrated in FIG. 3 is formed in well-known manner by initially forming a tube 21 of uncured elastomeric material, for example, by extrusion, in first extruder 18 in FIG. 2, thereafter passing tubular layer 21 through a reinforcement applicator 19 (FIG. 2) such as a wire braiding machine, to apply the first tubular braided layer 22 having filamentary reinforcing elements 23, thereafter passing the structure through a rubber layer applicator 52 to apply a second tubular layer 25 of elastomer material which overlies and is in contact with the wires 23 of the first braid layer 22, thereafter passing the structure through a second reinforcement applicator 53, such as a wire braiding machine to apply a second tubular braided layer 26 of filamentary reinforcing elements 27.

It is to be noted that the filamentary reinforcing elements, for example, wires 23 of the first braid layer 22 and likewise wires 27 of the second braid layer 26 are not in precisely the same cylinder but at some positions are closer to and at other positions are farther away from the axis 29 of the uncured tubular structure 20 as an inherent characteristic of the braiding operation. This in turn results in interstices 28 being formed where the groups of wires cross one another. These can best be seen by reference to FIG. 3A. Additional interstices of smaller size may occur between the individual wires 23 or 27 of the respective braid layer 22 or 26. It is desired that these interstices be filled with elastomer material. Filling of the interstices with elastomer material results in a hose structure which does not contain voids and thus has less internal movement of its components during operation and pressure service, particularly where that pressure is of varying magnitude. Reduction of such internal movement thereby increases service life of the hose.

According to the invention, the interstices are filled with uncured elastomer material by introducing fluid pressure into the bore 54 of the uncured tubular structure to force uncured elastomer material into the interstices of the braided layers. This is performed at consolidation station 56, after the uncured structure has been cut to length and plugged. As illustrated in FIG. 4, this is accomplished by hermetically sealing one axial end of the uncured tubular structure 20 with plug 46 and coupling the opposite axial end of tubular structure 20 to a fluid pressure inlet 31. Plug 46 and inlet 31 are secured by clamps 48. The fluid pressure inlet 31 is in turn coupled to a soucre P1 of fluid pressure via conduit 33. After coupling as just described fluid pressure from P1 is introduced into the bore 54 of the uncured tubular structure 20 to force uncured elastomer material of layers 21 and 25 into the interstices 28 of the respective braided layers 22 and 26 and to thereby consolidate the uncured tubular structure. Fluid pressure P1 is preferably maintained to the bore 54 of the uncured tubular structure 20 of a magnitude and a time sufficient to cause protrusion of uncured elastomer material radially outwardly of the axis 29 of the tubular structure through the braided layers 22,26 such that uncured elastomer material projects radially outwardly beyond radially outermost braided layer 26.

Complete consolidation of the uncured tubular structure 20 is indicated by the formation of rubber gobs 35 at interstices 28. The application of fluid pressure of lesser magnitude or for a shorter period of time may not fully consolidate the uncured tubular structure. However, any such application of fluid pressure to the bore of the uncured tubular structure is within contemplation of the invention and will result in partial filling of the interstices 28 and consolidation of the structure. It is preferred that no cover be applied to the uncured tubular structure 20 prior to introduction of fluid pressure to the bore so that any air trapped between the various layers of the uncured tubular structure 20 may readily escape.

Referring again to FIG. 2, after consolidation of the uncured tubular structure 20 (through introduction of fluid pressure into the bore 54 of the uncured tubular structure) the uncured tubular structure is passed through a cover layer applicator 57 in which a cover layer 58 of uncured elastomer material is applied, for example, by extrusion. This step is illustrated in FIG. 2. In a preferred embodiment of the process, no internal pressurization of the uncured structure exists at the time of covering of two-braid hose. Should internal pressurization be desired, the bore of the uncured structure is hermetically sealed by plug 46 at one end and at the opposite end is connected to air pressure source P2. The structure 41 is internally pressurized with air from source P2 at, for example, 20 psig. during cover elastomer material application. The air pressure is thereafter released from the bore of the covered structure 41.

Thereafter, the bore of the uncured, covered tubular structure 41 is connected to a source P3 of pressurized air.

The covered, consolidated structure 41 is thereafter cured in an autoclave 51 as illustrated in FIG. 2. During curing in autoclave 51 at a predetermined temperature exceeding room temperature and a predetermined externally applied steam pressure exceeding atmospheric pressure, the consolidated covered structure 41 is cured into an integral hose such as hose 10 shown in FIG. 1. The values for these parameters are conventional and will not be further discussed here. At the elevated temperature existing in the autoclave 52, the air pressure from source P3 is applied to the bore of the hose and is maintained at 15 psig. greater than the externally applied steam pressure from steam source P4 in the autoclave. As a specific example, $\frac{3}{4}$ inch inside diameter SAE 100R2 hose may be cured with a steam pressure from source P4 of 70 psig. (158° C.) for 25 minutes while the air pressure in the bore of the hose is maintained at 85 psig. through automatic equipment. This method ensures no pinholing through the hose wall due to excessive internal pressure in the bore. The bore pressure and autoclave pressure force the uncured elastomer material of the cover, if not already in such arrangement through the covering process, into complete contact with the wires of the second braid layer and the underlying layer of elastomer material, and prevent formation of voids in the hose structure through gasification of ingredients within the elastomer material compositions.

As a specific example of a consolidation process to which the invention is directed, $\frac{3}{4}$ inch inside diameter SAE 100R2 hose is prepared by formation of an uncured tubular structure 20 like that shown in 3A which is thereafter subjected while at room temperature to fluid pressure of 1200 psig. in its bore through the introduction of water at room temperature to its bore, the other end of the hose having been sealed after bleeding off any air trapped within the bore. The fluid pressure to the bore is maintained for 10 minutes. A cover layer of elastomer material is thereafter applied. One hose end is then plugged and the other hose end connected to air pressure source P3 which maintains the internal bore pressure at 15 psig. greater than the steam pressure P4 in autoclave 51. The hose is thereafter cured in autoclave 51 at 70 psig. steam for about 25 minutes.

Hydraulic hose having a single braided layer of reinforcing filaments or wires is consolidated using much lower pressures, for example, single braid layer hose is consolidated with 300 psig. air applied to the bore of the uncured structure for a period of about 10 minutes while the uncured structure is at room temperature (23° C.)

The consolidation step is completed in less time and with lower fluid pressures being applied to the hose bore by warming the hose to a temperature above room temperature but below that at which curing of the elastomer materials of the hose occurs prior to consolidation.

Thus, in a preferred embodiment of a consolidation process for $\frac{3}{4}$ inch inside diameter SAE 100R2 hose, the two-braid uncured tubular structure 20 is preheated in an oven at 80° C. (176° F.) for about two hours. Thereafter the uncured tubular structure 20 is internally pressurized to 300 psig. by plugging one end and clamping the other end onto an air line. Internal pressurization with 300 psig. air is maintained for about 20 minutes. For other hose sizes the period of consolidation will vary depending on the amount of reinforcement it contains. This process has an advantage over use of water as the pressurizing fluid in that the risk of braid contamination (from water) is eliminated.

The introduction of fluid pressure into the bore of the uncured tubular structure also serves to take up any slack in the braided layers so they will better act in unison when the hose is placed in pressure service. Thus, the consolidation process is of particular value in hose having multiple layers of reinforcing material. Pre-pressurization of the hose as described herein results in a hose 10 in which all the individual filamentary reinforcing elements 15,16 are supported by elastomer material which has been forced by fluid pressure from the interior of the hose radially outwardly. Such hose 10 is highly resistant to internal pressure since movement of hose components which would otherwise occur during placement of the hose in pressure service occurs prior to curing of the hose. The reinforcing elements are thus cured in the position they prefer to assume to resist fluid pressure contained in the bore 9 of the hose 10.

While open steam curing in autoclave 51 is preferred, the process illustrated in FIG. 2 can optionally include the application of a lead sheath to the covered structure prior to hermetically sealing one end thereof and coupling of the other end to pressure source P3. The application and purpose of such a lead sheath will be well understood by those skilled in the art of hose manufacture.

The magnitude of the fluid pressure which is introduced into the bore of the uncured structure to consolidate the uncured structure typically does not exceed 15 percent of the pressure required to burst the resulting completed cured hose. For example, three-fourths inch inside diameter SAE 100R2 hose having two wire braided layers when produced according to the process described herein is measured to burst at about 13,000 psig. and is consolidated by preheating the hose to 80° C. and pressurizing its bore with air to 300 psig. for 20 minutes or, with the hose at room temperature, pressurizing its bore with water to 1200 psig. at room temperature for about 10 minutes. The process described herein has the additional advantage of facilitating detection of any pin holes or discontinuities in the uncured structure since fluid flow will occur if a hole exists in the structure. Such imperfections when detected can be repaired prior to application of a coverforming layer of elastomer material.

It is believed that the process described herein is applicable to hose in which the filamentary reinforcing elements are positioned in the hose in arrangements other than the braided layers disclosed herein, for example, by spiral wrapping filamentary reinforcing elements in a helical pattern encircling the hose axis.

The term "elastomer material", as used herein, refers to thermosetting, crosslinking, or curable materials and includes natural and synthetic rubbers such as but not limited to neoprene, nitrile, Buna N, styrenebutadiene rubber, Hypalon TM, polyurethane, silicone and the like.

The term "thermoplastic material", as used herein, means materials which are solid at room temperature and which soften at an elevated temperature repeatedly. Thermoplastics are not cured. Thermoplastic materials such as Teflon TM, nylon, polyester terephthalate and certain polyurethanes may be employed in hose to be consolidated according to the method disclosed herein. However, with these, the complete hose structure having the filamentary reinforcing layers and underlying the thermoplastic layers but devoid of any outermost cover layer is raised to a temperature above that of room temperature so that the softened thermoplastic material may be forced radially outwardly through the filamentary reinforcing layers by the action of fluid pressure in the bore of the incomplete structure.

The term "polymer material", as used herein, includes both elastomer and thermoplastic materials as defined herein.

While certain representative embodiments and details have been shown for the purpose of illustrating the invention, it will be apparent to those skilled in this art that various changes and modifications may be made therein without departing from the spirit or scope of the invention.

What is claimed is:

1. In a method for producing filamentary reinforced polymeric hose including steps of:
   (a) providing an uncured tubular structure including one or more sub-units each comprising a radially inner tubular layer of polymeric material and in contact therewith an outer tubular layer of filamentary reinforcing material having interstices, the radially outermost layer of said structure being a tubular layer of the filamentary material
   (b) causing polymeric material of said inner layer to become present in said interstices, and
   (c) applying a cover layer of polymeric material, the improvement that
      (i) polymeric material of said inner layer is caused to become present in said interstices by introducing fluid pressure from an external source into the bore of the uncured structure to force uncured polymeric material of the radially outermost sub-unit to flow by said pressure into the interstices of the filamentary layer of the radially outermost sub-unit to consolidate the structure,
      (ii) said fluid pressure is thereafter removed, and
      (iii) a cover layer of polymeric material is applied to the consolidated structure.

2. In a method for producing filamentary reinforced elastomeric hose including:
   (a) providing an uncured tubular structure having a bore and including a tubular layer of uncured elastomeric material having superposed thereon and in contact therewith a tubular braided layer of textile filaments,
   (b) causing uncured elastomeric material to become present in the interstices of the tubular braided layer, and
   (c) curing the structure,
the improvement which comprises:
   (i) plugging an end of said uncured structure and introducing pressurized gas into the bore of the uncured structure and maintaining gas pressurization therein for a time sufficient to force uncured elastomer material into the interstices of the braided layer, and thereafter releasing the gas pressure,
   (ii) applying a cover layer of uncured elastomer material, and
   (iii) curing the covered structure at a predetermined temperature exceeding room temperature and a predetermined pressure exceeding atmospheric pressure whilst maintaining pressure in the bore of the covered structure at a predetermined level above that applied to the exterior of the covered structure.

3. In a method for producing filamentary wire braid reinforced elastomeric hose, including:
   (a) providing an uncured tubular structure having a bore and including a tubular layer of uncured elastomeric material having superposed thereon and in contact therewith a tubular braided layer of reinforcing wires,
   (b) causing uncured elastomeric material to become present in the interstices of the braid layer, and
   (c) curing the structure,
the improvement which comprises:
   (i) introducing and maintaining fluid pressure in the bore of the uncured structure to force uncured elastomeric material radially outwardly into the interstices of the braid layer,
   (ii) applying a cover layer of uncured elastomeric material to the uncured structure to form a covered structure,
   (iii) curing the covered structure in an autoclave while maintaining fluid pressure in the bore at a predetermined differential above that existing in the autoclave.

4. The method claimed in claim 3 wherein uncured elastomeric material is forced through the braided layer by the introduction and maintenance of fluid pressure to the bore of the uncured structure.

5. The method of claim 1, wherein the filamentary layer of each sub-unit includes a tubular braided layer of reinforcing element and a tubular layer of uncured elastomer material and fluid pressure is introduced into the bore of the structure causing protrusion of uncured elastomer material of the radially outermost sub-unit radially outwardly through the radially outermost braided layer such that uncured elastomer material projects radially outwardly beyond the braided layer of the outermost sub-unit, and the step of curing the covered, consolidated structure into an integral hose at a predetermined temperature exceeding room temperature.

6. The method of claim 5, further comprising the steps of hermetically sealing one end and connecting the opposite end of the covered structure to a source of air pressure prior to curing, and curing the hermetically sealed structure in an autoclave while internally pressurized.

7. The method of claim 6, further comprising the step of applying a lead sheath to the covered structure prior to curing.

8. The method of claim 1 or 5, wherein the uncured structure is maintained at room temperature while fluid pressure of a magnitude not exceeding 15 percent of the burst pressure as measured on the completed hose is introduced into the bore.

9. The method of claim 1 or 5, wherein the uncured structure is maintained at room temperature during introduction of fluid pressure not exceeding 1500 psig. into the bore and the fluid pressure is applied for not more than about 30 minutes.

10. The method of claim 1 or 5, wherein the uncured structure is raised to an elevated temperature exceeding room temperature and is maintained at said elevated temperature during introduction of fluid pressure into the bore.

11. The method of claim 5, wherein the uncured structure is raised to an elevated temperature exceeding room temperature but below said predetermined curing temperature and while at said elevated temperature is internally pressurized by a compressed gas to force polymeric material of the radially outermost sub-unit into the interstices of the filamentary layer of that sub-unit.

12. The method of claim 5, further comprising introducing fluid pressure into the bore of the covered, consolidated structure and maintaining said fluid pressure at a predetermined level above that applied to the exterior of the structure during curing of the structure at a predetermined pressure above atmospheric pressure and a predetermined temperature exceeding room temperature.

* * * * *